No. 682,760. Patented Sept. 17, 1901.
W. C. SHIPHERD.
THILL COUPLING.
(Application filed Oct. 23, 1899. Renewed Feb. 21, 1901.)
(No Model.)
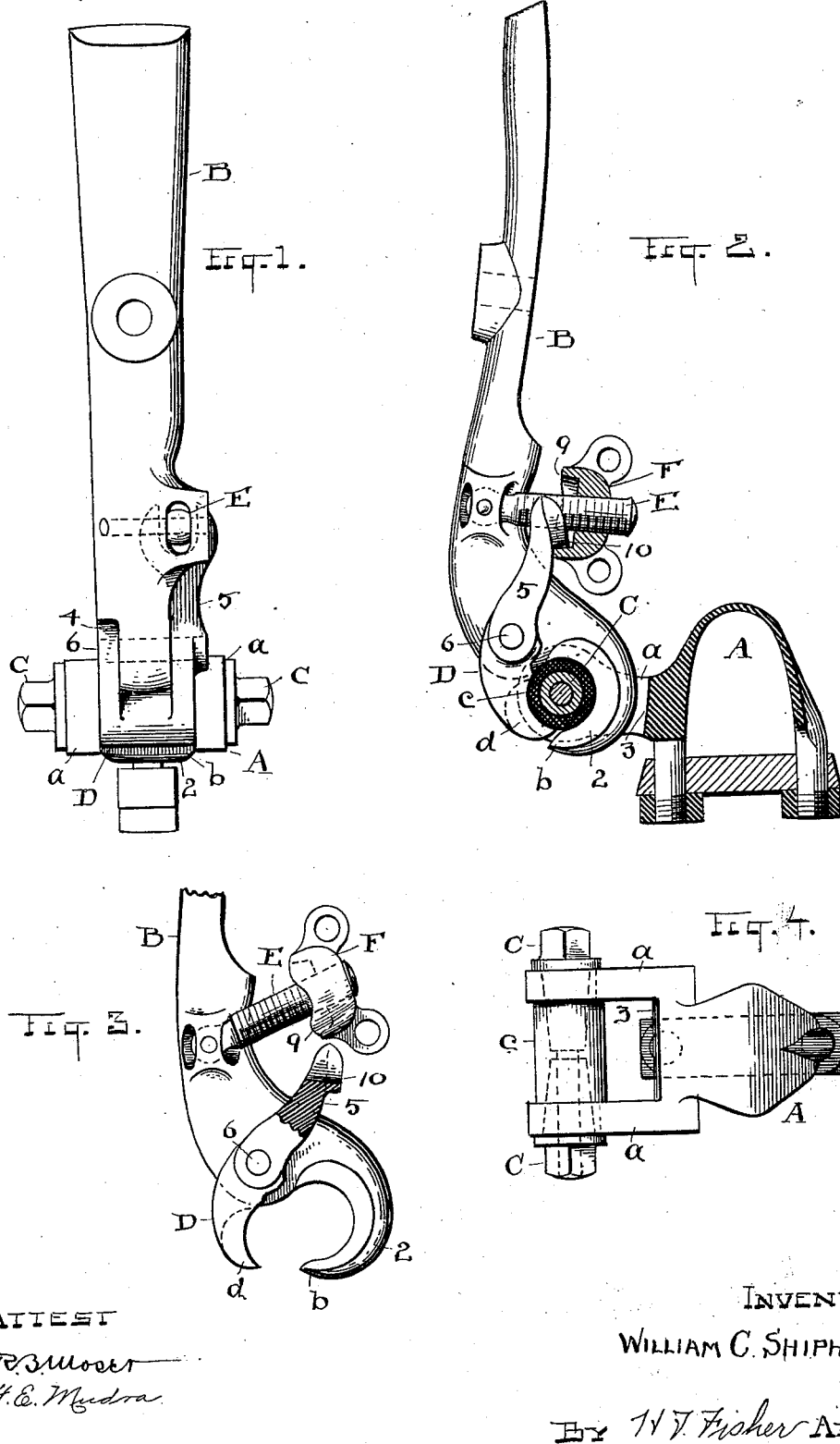
ATTEST
INVENTOR.
WILLIAM C. SHIPHERD.
By H. T. Fisher Atty

UNITED STATES PATENT OFFICE.

WILLIAM C. SHIPHERD, OF CLEVELAND, OHIO.

THILL-COUPLING.

SPECIFICATION forming part of Letters Patent No. 682,760, dated September 17, 1901.

Application filed October 23, 1899. Renewed February 21, 1901. Serial No. 48,333. (No model.)

*To all whom it may concern:*

Be it known that I, WILLIAM C. SHIPHERD, a citizen of the United States, residing at Cleveland, in the county of Cuyahoga and State of Ohio, have invented certain new and useful Improvements in Thill-Couplings; and I do declare that the following is a full, clear, and exact description of the invention, which will enable others skilled in the art to which it appertains to make and use the same.

My invention relates to thill-couplings; and the invention consists in a thill-coupling constructed to make convenient and speedy detachment of the thills and to prevent rattling when connected up, all substantially as shown and described, and particularly pointed out in the claims.

In the accompanying drawings, Figure 1 is a plain front elevation of one form of my invention; and Fig. 2 is a side elevation thereof, partly sectioned. Fig. 3 is a side elevation of the thill-iron, showing the locking-jaw open; and Fig. 4 is a plan view of the axle-clip seen in sectional elevation, Fig. 2.

A represents the axle-clip, having integral arms $a$ at its front, through which passes the coupling-pin C. Any suitable pin may be used with or without bushing, though bushing $c$ is shown in this instance.

B is the thill or pole iron, or the "eye-piece," as it is sometimes called. This piece is constructed with special reference to convenience in detaching or removing the thills or pole, but also with a view to perfect safety in use and a noiseless connection or one that will not rattle. I have found that more and more it is becoming desirable to have a thill or pole coupling adapted to be easily removed on entering the barn, and this is true in both private and public stables. To meet this growing demand and provide a popular coupling of easy detachment without sacrificing safety and other essential qualities is the object of this invention. To these ends chiefly the thill-iron is formed with a hook or hook-shaped engaging portion 2, brought down over the coupling-pin C, as in Fig. 2. This hook deepens in thickness from its edge $b$ upward, so that it is heavy and strong, especially where the strain comes upon it in service. This deepening of the stock, taken in connection with the shape of the hook, has the further advantage of rendering impossible the detachment of the hook when the horse is hitched in the thills, because the back of the hook will bear against the surface 3 of the clip and prevent further backing to lift the hook out. Hence when the horse is in and the thills are accordingly raised it is impossible that the thills should be uncoupled, except, of course, in case of accident, which might change the working relation of the parts. So far, therefore, as serviceability of the hook alone is concerned it can be successfully used and needs nothing auxiliary or additional to render it usable and safe, and in any event all the pull comes wholly on the hook; but mere working engagement alone is not all that is needed in a coupling of this kind, and besides being secured against rattling it should be secured also against removal, except as removal is specially desired. To these ends I employ an under jaw D, having its engaging portion on the coupling-pin and its sheath and the same width as the hook 2, as seen in rear view, Fig. 1, and provided with an ear 4 at one side and a controlling stem or arm 5 at the other side and supported through these on a pivot-pin 6, which runs through the head of the thill-iron at the base of hook 2. This construction and arrangement of parts brings the free end of arm 5 above the thill-iron, while the edge $d$ of the jaw D is shortened sufficiently to close within the edge of hook 2, as seen in Fig. 2. This enables the jaw D to be drawn as close or tight as may be wanted, and it is fastened and held in this instance by means of a screw E, loosely pivoted in the side of the thill-iron, and a nut F thereon. The screw may be slightly upset at its outer end after the nut is put on, so as to prevent the nut from possibly losing off, and the nut is peculiar in this that it has a cavity on its under side and an undulating or wavy edge 9. Matching this cavity is a segmental flange 10 about the crescent-shaped opening in the end of the arm 5, where it comes somewhat astride the screw E. The arm 5 has a slight rise at the back of flange 10 to cause the depressions in nut edge 9 to engage thereon sufficiently to cause a lock for the nut. Then it follows when the nut is tightened that this lock will surely hold it, and the yield in the rubber or other like bushing c both enables a very close screwing up of the coupling to be made upon its seat and the turning of the nut to locking position. The flange 10 comes within the cavity of the nut when locking up occurs.

When the term "thill-iron" is used herein, it may be considered as including "pole-iron" as well, because the iron is used both with shafts or thills and poles or tongues indiscriminately, and its association is immaterial.

Broadly the term "clip" is used to cover and include the construction in Fig. 4 with its two forward arms.

What I claim as new, and desire to secure by Letters Patent, is—

1. In thill-couplings, an axle-clip, a thill-iron and a jaw pivoted on said iron between its ends and constructed to confine the iron on the clip, and a screw and nut to engage the front free end of the jaw and lock it in working position, substantially as described.

2. A thill-coupling comprising an axle-clip having a transverse seat for the thill-iron, the thill-iron hooked on said seat and a swinging jaw pivoted between its ends on the side of said iron and adapted to engage from the bottom against the said seat and confine the thill-iron in working position, and a screw and nut independent of the said jaw to lock the jaw, substantially as described.

3. The coupling substantially as described, consisting of the axle-clip having a forwardly-extending portion and a rounded cushioned seat thereon for the thill-iron, in combination with said iron engaged over said seat from above, a jaw pivoted on the thill-iron between its ends on a horizontal pivot and constructed at one end with a bearing to be engaged by a fastening screw and nut, and the said screw and nut constructed to lock on said jaw and to swing independently thereof, substantially as described.

4. As a new article of manufacture, a thill-iron having its free end constructed with a hook adapted to be engaged on an ordinary axle-clip, a jaw pivoted on said iron between its ends and having at one end a hook portion to engage on said clip from beneath, and a screw pivoted on said iron in front of the said jaw and having a nut to bear upon the corresponding end of said jaw and hold it in engaging position, substantially as described.

5. The thill-iron having a hook on its rear end, a locking-jaw pivoted on said iron in front of said hook and a locking screw and nut thereon for said jaw pivoted on the iron in front of said jaw, substantially as described.

Witness my hand to the foregoing specification this 16th day of October, 1899.

WILLIAM C. SHIPHERD.

Witnesses:
H. E. MUDRA,
R. B. MOSER.